United States Patent
Ridolfi et al.

(10) Patent No.: US 7,350,806 B2
(45) Date of Patent: Apr. 1, 2008

(54) STEERING WHEEL WITH A STATIC DRIVER AIRBAG MODULE

(75) Inventors: Roberto Ridolfi, Tregnago (IT); Valerio Poli, Villa Bartolomea (IT); Adolfo Ridolfi, Tregnago (IT)

(73) Assignee: Key Safety Systems, Inc., Sterling Heights, MI (US)

( * ) Notice: Subject to any disclaimer, the term of this patent is extended or adjusted under 35 U.S.C. 154(b) by 328 days.

(21) Appl. No.: 11/226,591

(22) Filed: Sep. 15, 2005

(65) Prior Publication Data

US 2006/0125216 A1   Jun. 15, 2006

(30) Foreign Application Priority Data

Dec. 13, 2004   (EP) .................. 04029674

(51) Int. Cl.
*B60R 21/16* (2006.01)
(52) U.S. Cl. ...................... 280/731; 280/771
(58) Field of Classification Search ............... 280/731, 280/728.2, 93.512, 771, 93.502; 74/431, 74/552

See application file for complete search history.

(56) References Cited

U.S. PATENT DOCUMENTS

| 5,558,365 | A | 9/1996 | Oe et al. |
| 6,264,235 | B1 | 7/2001 | Battermann et al. |
| 6,976,703 | B2 * | 12/2005 | Holmes et al. ............. 280/731 |
| 2003/0067147 | A1 | 4/2003 | Holmes |
| 2003/0164060 | A1 | 9/2003 | Menjak |

FOREIGN PATENT DOCUMENTS

| DE | 199 04 321 A1 | 8/2000 |
| EP | 0 239 998 A1 | 10/1987 |
| EP | 1 342 639 A2 | 9/2003 |
| ES | 2 185 465 A1 | 4/2003 |

* cited by examiner

*Primary Examiner*—Faye M. Fleming
(74) *Attorney, Agent, or Firm*—Lonnie Drayer

(57) ABSTRACT

An assembly of a steering wheel with static airbag module has a rotor portion and a stator portion. A first gear and a second gear are at least partially superimposed. An intermediate supporting element is located between first and second gears with the gears directly axially coupled. An intermediate element has a portion that defines a path for the means for axially coupling said first and second gear to temporarily disengage them from the gears when a relative rotation between the intermediate element and the first and second gears occurs.

15 Claims, 8 Drawing Sheets

STEERING WHEEL WITH A STATIC DRIVER AIRBAG MODULE

FIELD OF THE INVENTION

The present invention relates to a static driver airbag module assembly mounted on a vehicle steering wheel.

BACKGROUND OF THE INVENTION

A common driver airbag module is mounted on a vehicle steering wheel usually fixed to a hub, which in turn is coupled to a steering shaft. Consequently a driver airbag module rotates in unison with the steering wheel. Since the deployment of the airbag may occur at different orientations of the steering wheel with respect to the vehicle driver, the airbag has to be circular to always provide the same protection surface to the driver.

Recently, assemblies have been provided that allow the driver airbag module to remain in a stationary position with respect to the vehicle during rotation of the steering wheel. This type of module is known as a static driver airbag module.

Advantageously, static driver airbag modules may provide airbags having shapes other than circular, since there is no rotation of the same with respect to the driver. Thus airbags may be designed to fit the internal volume of a particular vehicle when deployed, in such a way to better protect the driver regardless of the angular position of the steering wheel.

DISCUSSION OF THE PRIOR ART

Different solutions have been provided for stationary mounting a driver airbag module on a steering wheel.

US 2003/0067147 discloses a static driver airbag assembly that comprises a rotatable steering wheel encompassing an accessible space and coupled to the respective shaft by a planetary gear system. The planetary gear system transfers torque applied to the steering wheel ring portion directly to the steering shaft. An airbag module is positioned within the accessible space encompassed by the steering wheel and remains in a stationary position during rotation of the steering wheel.

Prior art assemblies provided with gears usually have a complicated structure that leads to high production costs and time-consuming mounting operations. Moreover, since gears typically rotate each around its own axis, it is necessary that the assembly gears have exact dimensions to avoid damping of the force transmitted by the driver to the steering shaft or the raising of an offset between the rotation angle of the steering wheel ring portion and the rotation of the steering shaft. If one of the static driver airbag module components has dimensions different from what is specified, a non-uniform rotation of the steering wheel ring portion may occur, for example due to the imperfect matching between the gears.

ES 2185465 discloses an assembly for stationary mounting an airbag module on a steering wheel. The assembly comprises a rotor portion fixed to the ring portion of a steering wheel and a stator portion that is stationary with respect to the vehicle. The stator portion comprises two coaxial pulleys which support an airbag module and are coupled to two return pulleys of the rotor portion by belts.

U.S. Pat. No. 5,558,365 discloses an assembly provided with main pulleys mounted in a stationary manner with respect to the steering shaft for supporting an airbag module and with a rotor portion coupled to the steering wheel ring portion. The rotor portion is interposed between the pulleys and is itself provided with two secondary pulleys. The main pulleys and the secondary ones are coupled by belts.

A drawback of such solutions is that a tensioning device has to be provided for the belts. Moreover the belts loose their mechanical properties in time as they undergo mechanical and thermal stresses.

US 2003/0164060 discloses a steering wheel for a vehicle provided with a second shaft other than the steering shaft. The second shaft is supported via bearings by a stationary hub, which includes a driver airbag module housing, such that it is rotatable about its own axis and is coupled to the steering shaft by an arm or an electronic actuator. The actuator includes a position sensor for detecting an angular displacement of the second shaft from a selected origin and producing a signal indicative of said angular displacement. Such a signal is transmitted to a road wheel actuator so that the position of road wheels properly corresponds with the position of the steering wheel.

Generally, solutions based on a plurality of shafts are complicated and expensive. Duplication of the steering shaft permits to pass the airbag module wirings easily inside the steering wheel column, but requires accurate design and assembly, expensive mechanical components and eventually electronic devices.

Moreover, traditional assemblies provided with a plurality of gears or shafts are normally cumbersome. Consequently, vehicle steering columns have to be designed accordingly to fit such assemblies. Therefore, there is a need for a reliable and compact driver airbag module assembly that does not rotate with the steering wheel and that can be fitted on existing steering columns without having to re-design the same.

SUMMARY OF THE INVENTION

The present invention provides an assembly of a steering wheel and a static driver airbag module that obviates the above problems of the prior art assemblies, also allowing for considerable cost reduction.

The present invention provides an assembly of a steering wheel and a static driver airbag module that is compact and reliable and permits mounting of a module on the related steering wheel in an easy way.

An assembly of a steering wheel and a static driver airbag module of the present invention comprises a rotor portion and a stator portion; a first gear and a second gear, which are at least partially superimposed; an intermediate element supporting said first and second gear and means for axially coupling said first and second gear, said intermediate element having at least a first portion interposed between said two gears and at least a second portion extending from said first portion, said second portion defining a path for said means for axially coupling said first and second gear to disengage said means from said gears and to successively engage again said means with said gears when a relative rotation between said intermediate element and said first and second gear occurs.

DETAILED DESCRIPTION OF THE INVENTION

As used herein and in the claims the term "static driver airbag module" refers to an assembly that allows a driver airbag module to remain in a stationary position with respect to the vehicle during rotation of the steering wheel.

Figure 1:
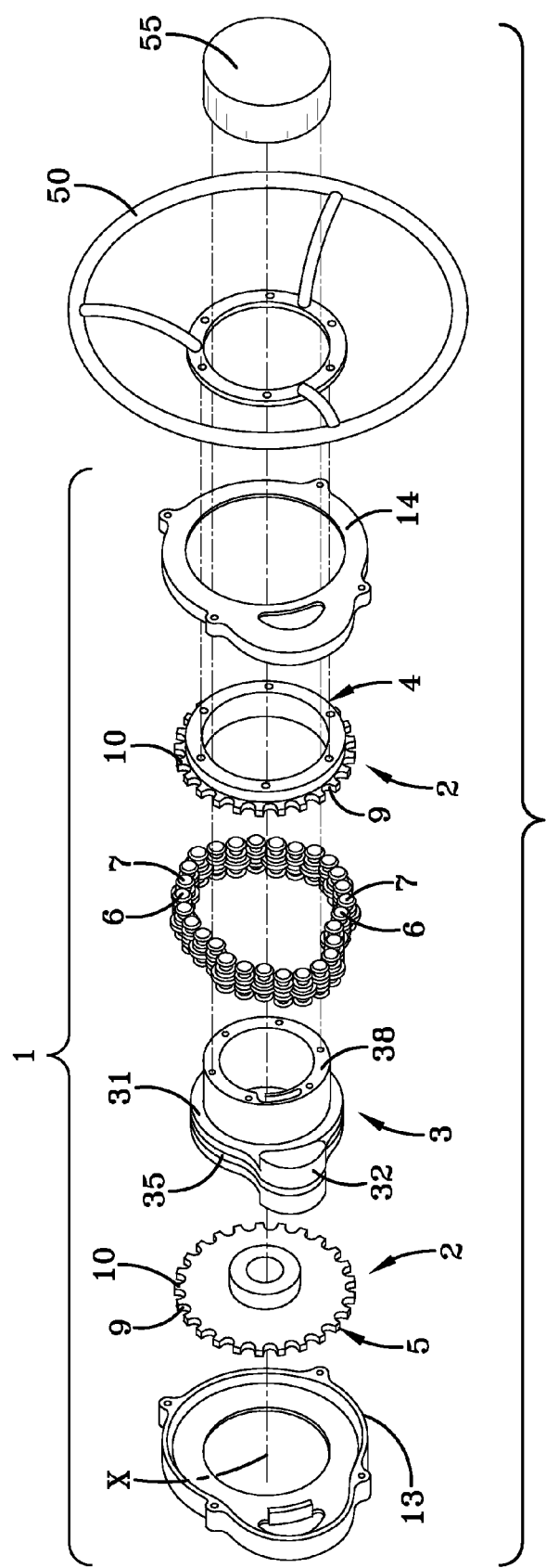
FIG. 1 is an exploded view of an embodiment of the assembly according to the present invention.

A first embodiment 1 of an assembly of a steering wheel 50 and a static driver airbag module 55 of the present invention is shown, in an exploded view, in FIG. 1, comprising a rotor portion 2 and a stator portion 3. The rotor portion 2 comprises at least two gears 4, 5. At least a first gear 4 is coupled to the external ring portion of the steering wheel, that is the portion normally held by the driver to transmit the torque to the steering shaft. Thus the gear 4 is a driving gear that imparts torque to at least one driven gear of the assembly 1. The assembly 1 shown in FIG. 1 is provided with the driven gear 5 that is coupled to the steering shaft of the vehicle (not shown).

The gears 4, 5 are at least partially superimposed. The gears are one above the other, at least partly, preferably completely, without actually touching each other because they are supported and separated by the intermediate element. The superimposed portions of the gears, e.g. the teeth of the two gears, are axially coupled by detachable elements that extend from the first gear to the second gear to transmit the torque and, preferably, also axial forces.

In the embodiments where the gears are the rotor portion of the assembly, the two gears also have the function of supporting axial forces, other than transmitting torque, and a means of transmitting the axial forces is required in the form of one or more coupling elements that can move around the gears and that can be detached from the same.

The assembly of the present invention has a compact structure with respect to prior art assemblies. In fact, the gears preferably are circular gears arranged at least partially superimposed, a first gear being located on a first side of the intermediate element and a second gear being located on a second side of the intermediate element. Preferably the first and second gear have the same size and are arranged coaxially, so as to be completely superimposed, with the intermediate element being sandwiched between the gears. This arrangement permits to minimize the overall dimensions of the assembly and at the same time to avoid dedicated design of the related vehicle steering column or the use of two steering shafts.

The rotation of the rim or ring portion of the steering wheel 50 relative to the driver airbag module 55 is obtained by the gears 4, 5 and an intermediate element 3 supporting the gears and positioned between them to keep them spaced from each other. The space between the gears is used by the intermediate element to connect the driver airbag module 55 to the vehicle. The intermediate element 3 is provided with a passage such as a port, or duct, to have the wires and all electrical connections reach the static driver airbag module 55 without interfering with the rotation of the steering wheel.

For the scope of the present application, the terms "gear" and "gears" is intended to refer to any element that transmits torque and motion to the coupling means. For instance, gears may be toothed wheels or cylinders, lobed wheels or cylinders, as well as wheels or cylinders provided with grooves or hollows, etc.

As shown in FIGS. 1-4, the gears 4, 5 are externally toothed wheels separated by the stator portion 3. The gears 4, 5 are shown arranged coaxially along the axis X, but in general an offset may be provided between them, i.e. the gears 4, 5 overlap at least partially.

The driving gear 4, the driven gear 5, and eventually other gears of the assembly 1, are rotatably coupled to a stator portion 3, which is an element positioned intermediate between the gears 4, 5 and is intended to be mounted in a stationary manner on a vehicle steering column for supporting an airbag module 55 or other controls. For instance, the intermediate element 3 may be fixed in a stationary position to the vehicle frame or interior. One gear 4 is coupled to the ring portion of the steering wheel 50, which is rotated by the vehicle driver, and drives the other gear 5 by axially coupling elements that transmit the torque. The coupling elements 3 are moved by the driving gear 5 and circulates, according to a defined path, around or internally the intermediate element. A driver airbag module 55 is fixed to the intermediate element 3 and is stationary with respect to the vehicle driver.

Figure 4:
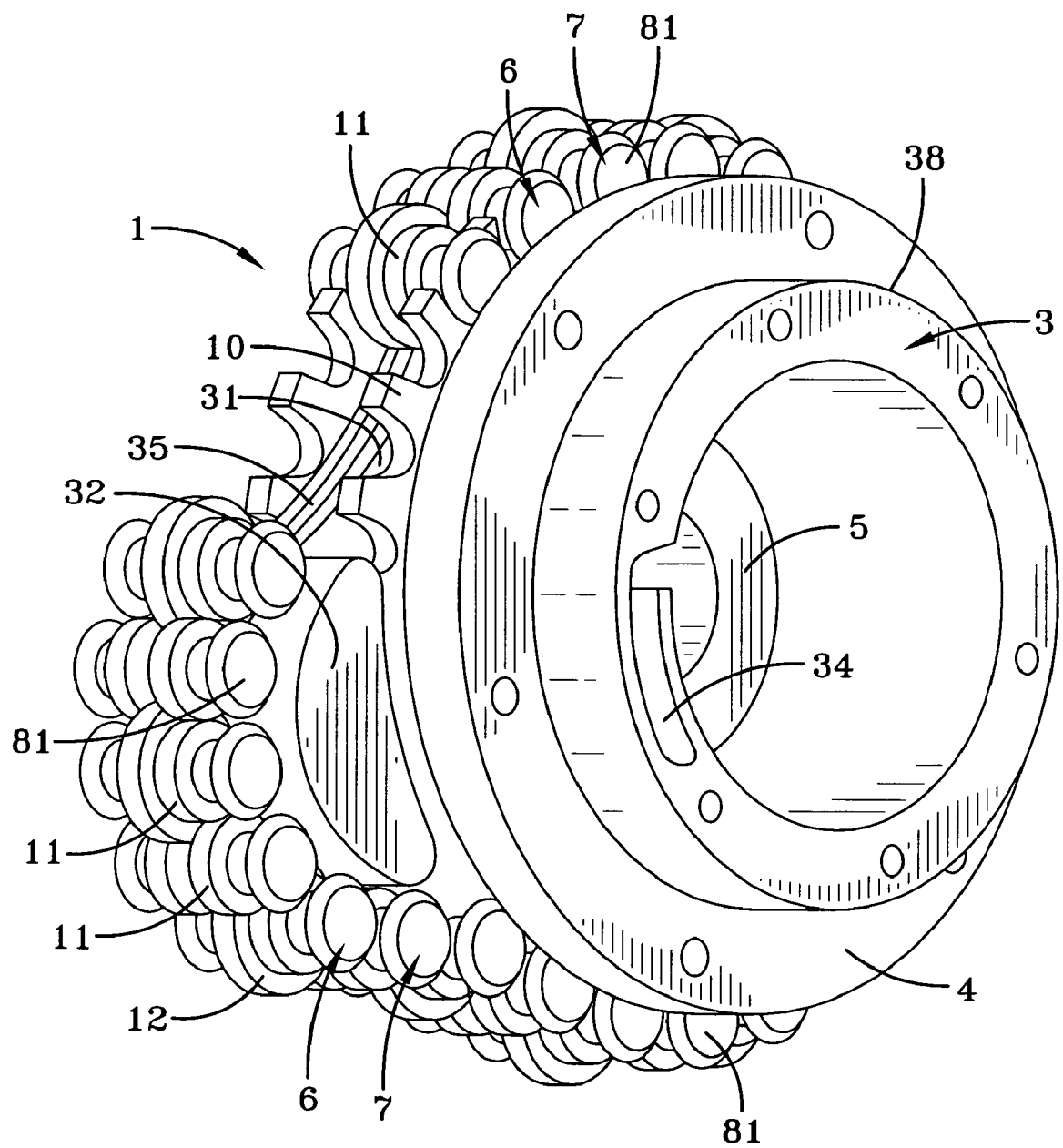
FIG. 4 is a perspective cut-away view of the assembly shown in FIG. 2.

The static intermediate element 3 may have different shapes provided that the driving gear 4 and the driven gear 5 are coupled to opposed sides of the intermediate element 3. In other words, a first part 31 of the intermediate element 3 is interposed between the gears 4, 5. The first part 31 has a substantially circular shape. The gears 4, 5 rotate on the first part 31, for example by sliding on the same or, alternatively, supported on it by bearings positioned between each gear 4, 5 and the stator 3. FIG. 4 is a cut-away view of the assembly 1 that shows the gears 4, 5 fitted on a central portion 38 of the stator 3, each gear 4, 5 abutting a side of the first part 31. In this configuration the gears 4, 5 are arranged substantially coaxially along the axis X. The airbag module 55 is eventually fixed to the central portion 38 of the stator element 3.

Preferably the means for axially coupling said first and second gear are a plurality of separate rollers having a cylindrical core that engages the gears. Along said core, the rollers may be provided with two or more disc portions which at least partially fit said groove or which permit the vertical abutment of the same rollers one with another, extending from the core, for the vertical abutment of the coupling elements one with another. Some rollers may have one or more disc portions.

At least a second part 32 of the intermediate element 3 departs from the first part 31 on gears 4, 5 rotate. The second part 32 is preferably lobe-shaped, i.e. a shape that generally deviates from the circumference of the first portion. In a possible embodiment (not shown) the intermediate element 3 may be provided with several lobes and the airbag module 55 may be fixed to such lobes. The function of this second part, lobe-shaped, is to define a path, in the manner of a cam, that the coupling means follow, in the manner of a cam follower; along this path the coupling means are initially detached from the first and second gears and driven around the lobe portion to be then brought again into engagement with the gears and follow the path defined by the gears.

A plurality of coupling elements 6, 7 are provided for axially coupling the gears 4, 5 and for transmitting the torque, and possibly axial loads, from the driving gear 4 to the driven gear 5. The coupling elements 6, 7 are moved around the intermediate element 3 under the momentum exerted by the driver on the steering wheel 50.

Axial loads, i.e. forces acting on the assembly substantially along the axis of the gears, are sustained by the same gears. Thus when a load is applied also to the coupling elements, such load is sustained by the gears, and, in the embodiments where the gears are the rotor portion of the assembly, the same gears transmit the load to the intermediate element.

Figure 9:
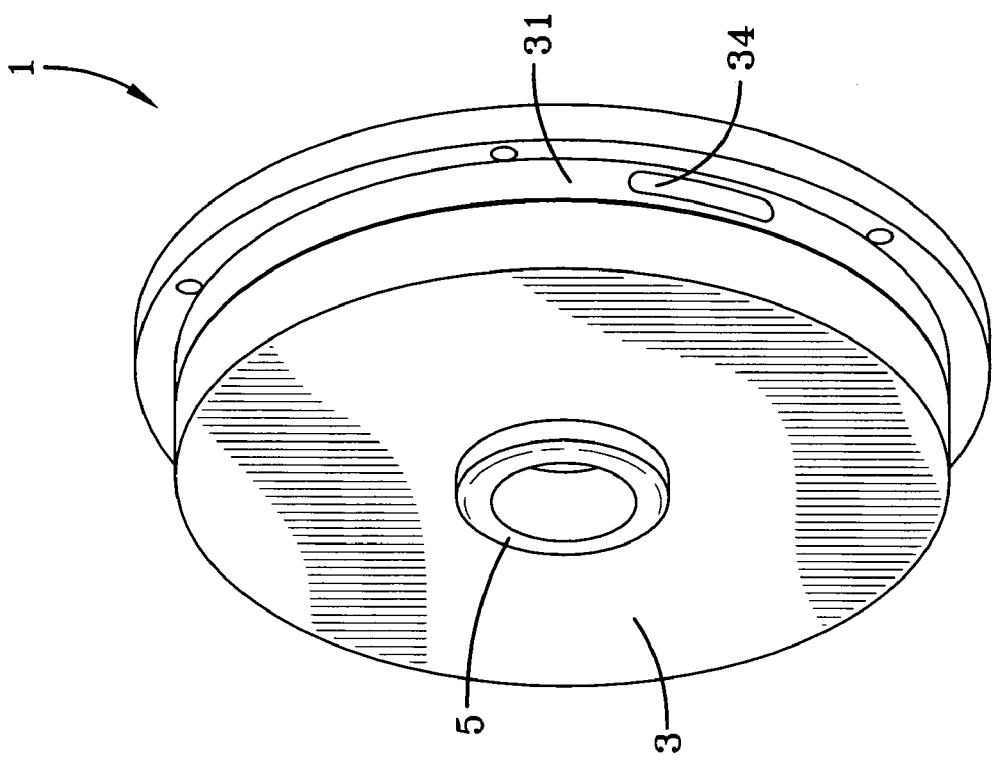
FIG. 9 is a perspective rear view of the assembly of FIG. 7.
Figure 10:
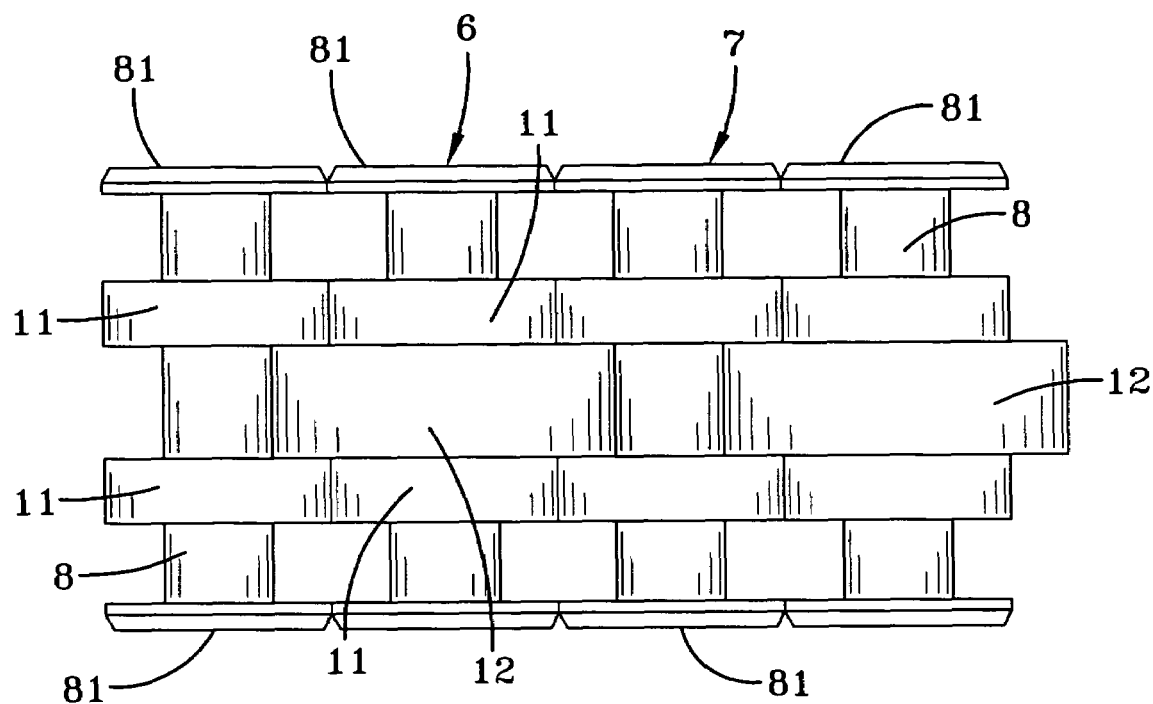
FIG. 10 is a side view of a component of the assembly shown in FIG. 1.

Preferably, as shown in FIGS. 1-11, the coupling elements 6, 7 are rollers. The coupling elements may be separate elements or linked one to another to form a chain. Alternatively a belt may be used. FIG. 10 is a side view of the separate rollers 6, 7 shown in FIGS. 1-4. The rollers 6, 7 have a central core 8 intended to simultaneously engage the gears 4, 5, i.e. the central core 8 engages the vanes between adjacent teeth 10 of the driving gear 4 and driven gear 5 to synchronise the rotation of the gears 4, 5 at the time of the operation of the assembly 1. Separate rollers 6, 7 are provided with disc portions 11 that favor the vertical abutment of the rollers 6, 7, side by side as shown in perspective in FIGS. 1 and 4. If the coupling elements are arranged in a chain or when a belt is used, such disc portions 11 may be not necessary. If a belt or a chain is used as a coupling means, one or more bearings are provided for supporting the gears on the intermediate element, said bearings resisting forces substantially acting along their axis.

The intermediate element 3 is preferably provided with a guide 35 that runs at the periphery of the first part 31 and second part 32, forming a loop; coupling elements 6 are in this embodiment provided with a central disc portion 12 that engages guide 35. As shown in FIG. 10, the disc portion 12 is larger than the disc portions 11 and, consequently, the rollers 6 are arranged between two other rollers 7. The ends of each roller 6, 7 are provided with a means for preventing the roller 6, 7 from axially sliding, i.e. the rollers 6, 7 are prevented from disengaging the gears 4, 5 through a vertical movement between two adjacent teeth of a gear 4, 5. As shown in FIGS. 4 and 10, preferably the rollers 6, 7 are provided with enlarged ends 81 that abut the teeth 10. The ends 81 have a section greater than the section of the core 8 and cannot axially slide through the vanes 9. The teeth 10 are then interposed between the ends 81 and the disc portions 11. If a load is applied on the rollers 6, 7 the rollers 6, 7 transmit the load to the gears 4, 5 through the portions 11.

The enlarged ends 81 of the rollers or similar retaining means avoid the rollers from sliding along their axis to disengage the teeth of the gears. For instance, the section of the rollers at their ends may be larger than the section of their core. In this way the ends are prevented from axially sliding between two adjacent teeth of a gear. The rollers preferably also have another two enlarged portions spaced from the enlarged ends enough to house the gears teeth, so as to provide a good transmission of the axial forces.

With reference to FIG. 4 (wherein some rollers 6, 7 are not shown for greater clarity), the rollers 6, 7 engage the gears 4, 5 when moving around the first part 31 of the intermediate element 3. On the contrary, when the rollers 6, 7 circulate around the lobe portion 32, or around other possible lobe portions, they do not engage the gears 4, 5.

When the driving gear 4 is subject to forces acting substantially along its axis X (axial forces), said forces are partly supported by intermediate element 3 and partly transmitted to the rollers 6, 7 and, through them, the driven gear 5 and the steering shaft. If the coupling elements are arranged in a chain or if a belt is used, bearings may be utilized to sustain the axial forces, positioned between the gears 4, 5 and the intermediate element 3. In the embodiment shown in FIGS. 1-4, the assembly 1 is provided with a casing, comprising two halves 13, 14, that co operates with the intermediate element 3 in guiding the coupling elements 6, 7 in moving along their path.

Figure 2:
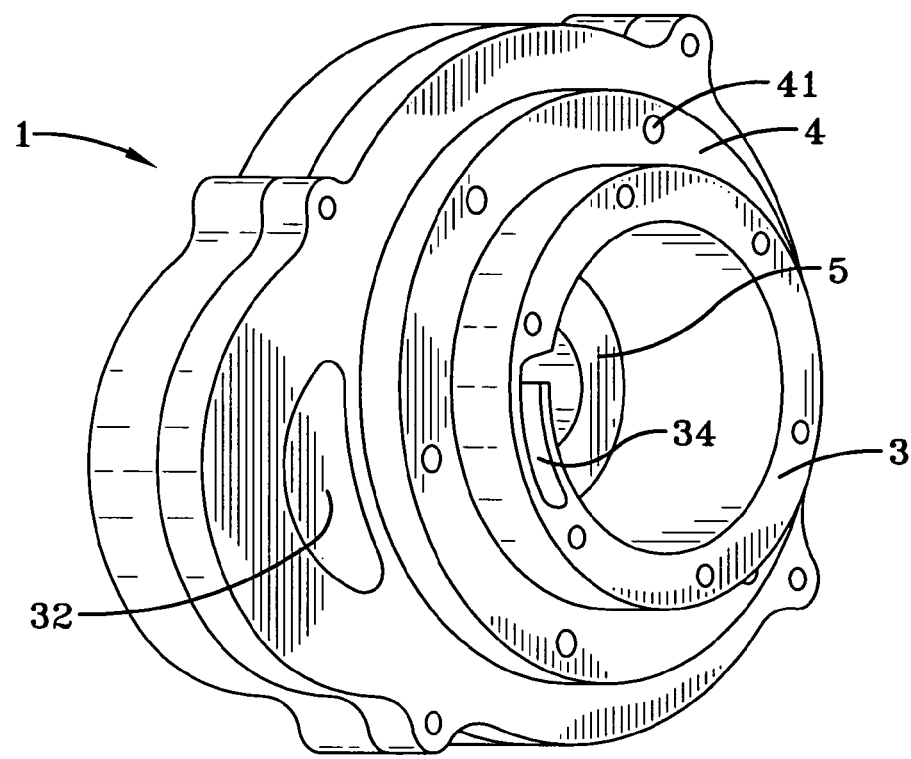
FIG. 2 is a perspective front view of the assembly shown in FIG. 1.
Figure 3:
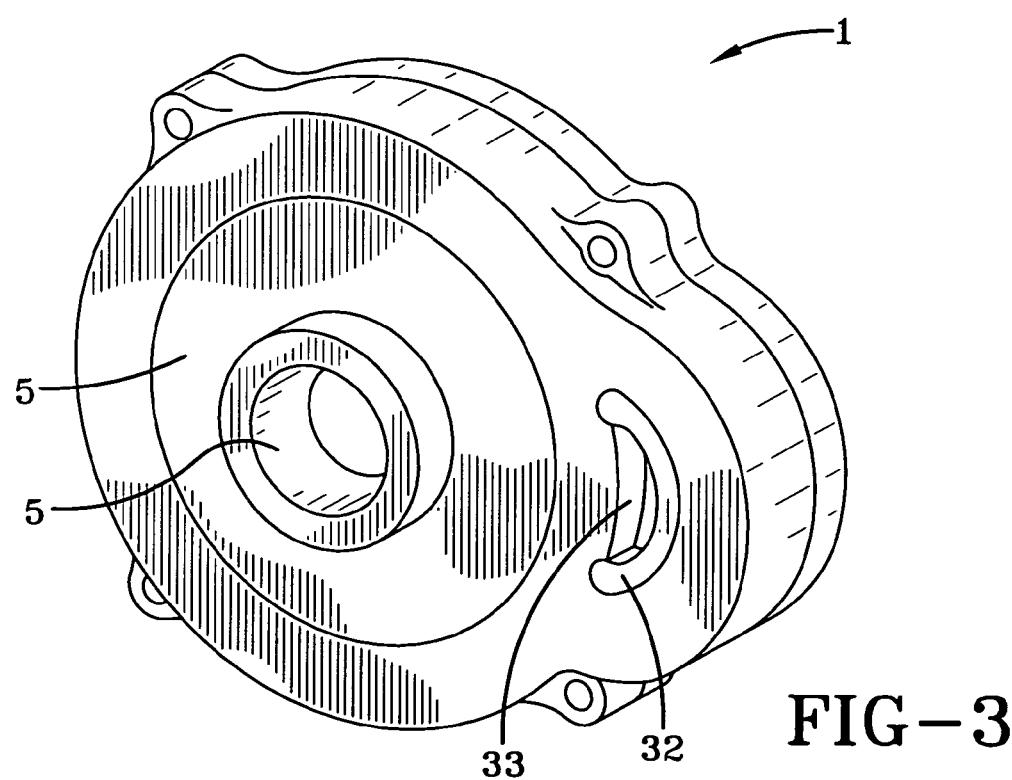
FIG. 3 is a perspective rear view of the assembly of FIG. 1.

The lobe portion 32 urges the coupling elements 6, 7 from the circular path they follow around the first part 31 of the intermediate element 3. In this way it is possible to have an access for the wiring of the driver airbag module 55 or other automotive controls from outside the rotor portion 2 to the internal volume of the same, through the gears 4, 5. As best shown in FIGS. 2 and 3, the intermediate element 3 is provided with a passage that communicates an exit, or port, 33 of the lobe portion 32 with an exit, or port 34, which opens internally to the central portion 38 of the stator 3, by-passing rotating parts such as gears 4, 5, the spokes of the steering wheel 50 are eventually coupled to the holes 41 of the driving gear 4, etc. Wires that connect the airbag module 55 to the related control device may be inserted through the passage, in this way by-passing rotating parts.

The gears 4, 5, the intermediate element 3 and the casing 13, 14 may be made of a metallic material or a plastic material, depending on the torque that has to be transmitted to the steering shaft and on the forces that are transmitted parallel and transverse to the axis X. The embodiment 1 shown in FIGS. 1-4 utilizes steel gears 4, 5 and rollers 6, 7 while the intermediate element is made of a plastic material such as ABS or Teflon®.

Generally the gears 4, 5, as well as the intermediate element 3, may be made of a plastic material, a metallic material or in any material suitable to sustain the torque and loads that are imparted by the driver to the steering wheel 50.

Figure 5:
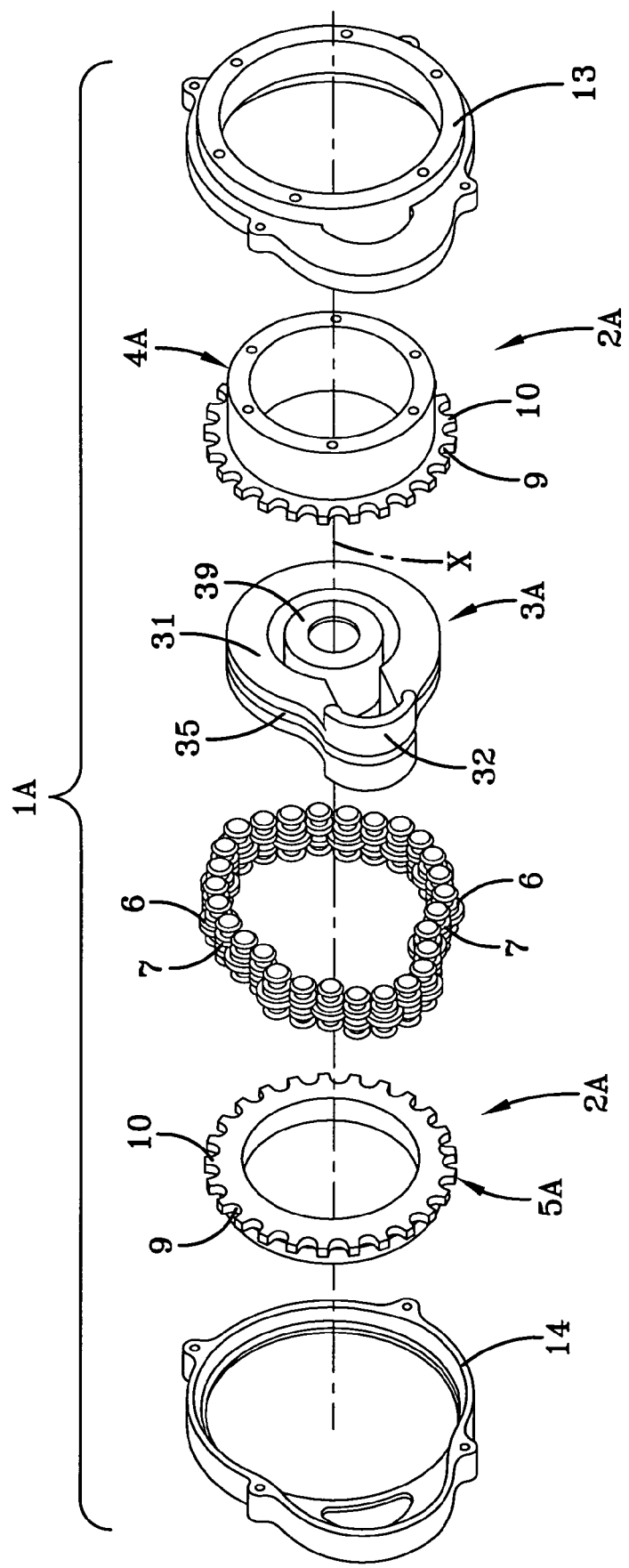
FIG. 5 is an exploded view of another embodiment of an assembly according to the present invention.
Figure 6:
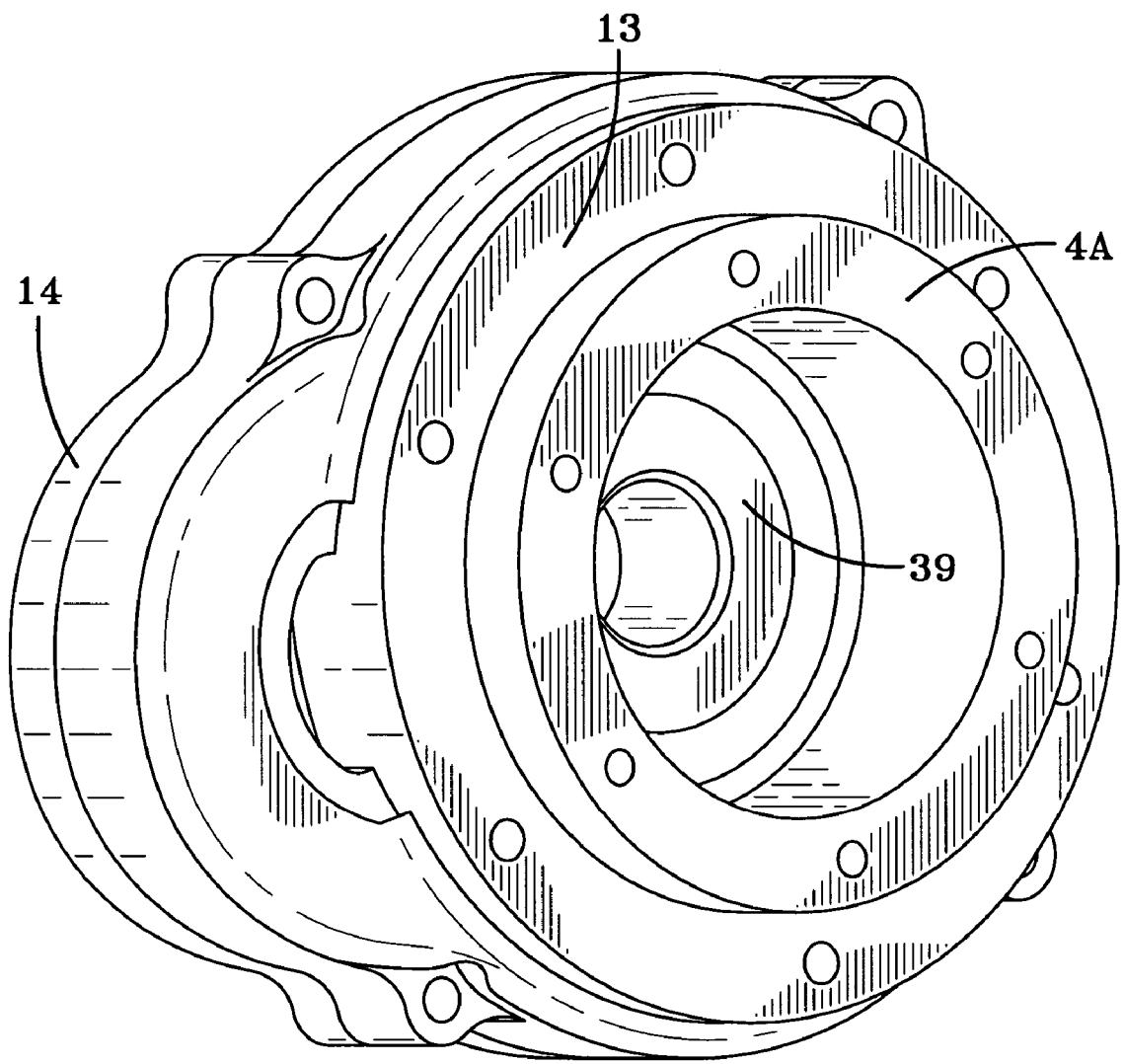
FIG. 6 is a perspective front view of the assembly shown in FIG. 5.

A second embodiment 1A of the assembly of the present invention is shown in FIGS. 5 and 6. The assembly 1A differs from the assembly 1 of the figures in that the rotor portion and the stator portion are reversed in their kinematics. In this embodiment, the stator portion 2A comprises two gears 4A, 5A, which are intended to be stationary with respect to the vehicle, while the rotor portion is the intermediate element 3A that rotates with the steering wheel. One gear 5A is fixed to the vehicle, for instance to a frame part, while the other gear 4A supports the driver airbag module or other electronic devices, automotive controls, entertainment systems, etc. The intermediate element 3A is coupled to the steering shaft along the axis X and to the steering wheel ring portion, for example through the lobe portion 32 or the central portion 39. In this case the intermediate element 3A rotates in phase with the steering wheel and shaft. The rollers 6, 7 initially engage both of the gears 4A, 5A. As the driver rotates the steering wheel, thus rotating the intermediate element 3A, a relative rotation occurs between the rollers 6, 7 and the intermediate element 3A. The rollers 6, 7 move radially with respect to the gears 4, 5, i.e. as the portion 32 of the intermediate portion 3A comes into contact with a roller 6, 7 this is moved away from the gears 4, 5 in a radial direction with respect to their axis X, while when the portion 31 of the element 3A approaches the same roller 6 or 7 this returns in engagement with the gears 4, 5.

In this embodiment axial forces acting on the intermediate element 3A are sustained by the gears 4A, 5A.

As shown in FIG. 6, the embodiment 1A is extremely compact as is the first embodiment 1. The diameter of the assemblies 1, 1A may vary between a few centimeters, for example 4 or 5 cm (about 1.5 or 2 inches), to 20 cm (about 8 inches) or more. Thus both the assemblies 1, 1A are easily used on conventional steering wheel columns without expensive adjustments of the same.

Figure 7:
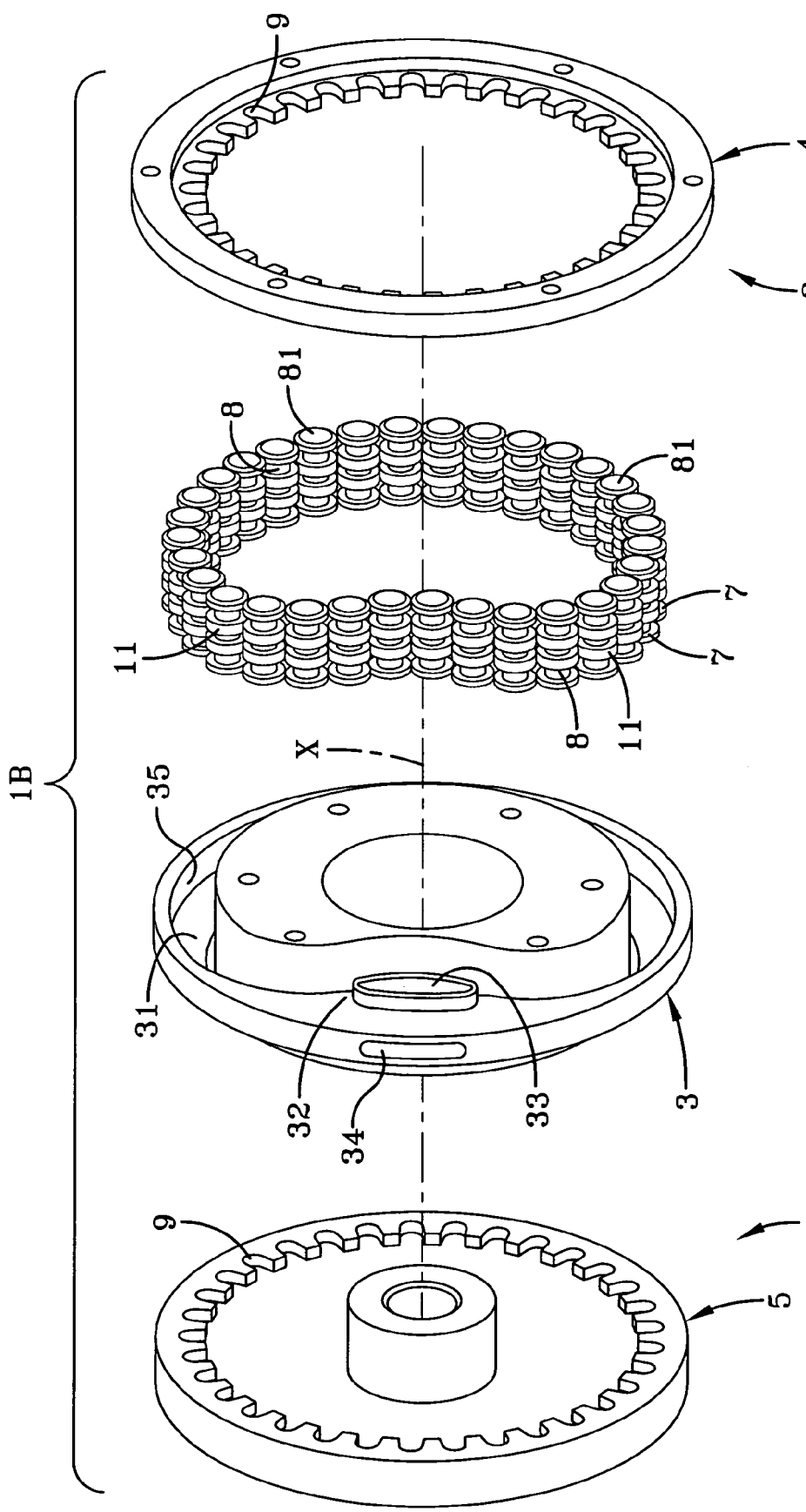
FIG. 7 is an exploded view of yet another embodiment of an assembly according to the present invention.
Figure 8:
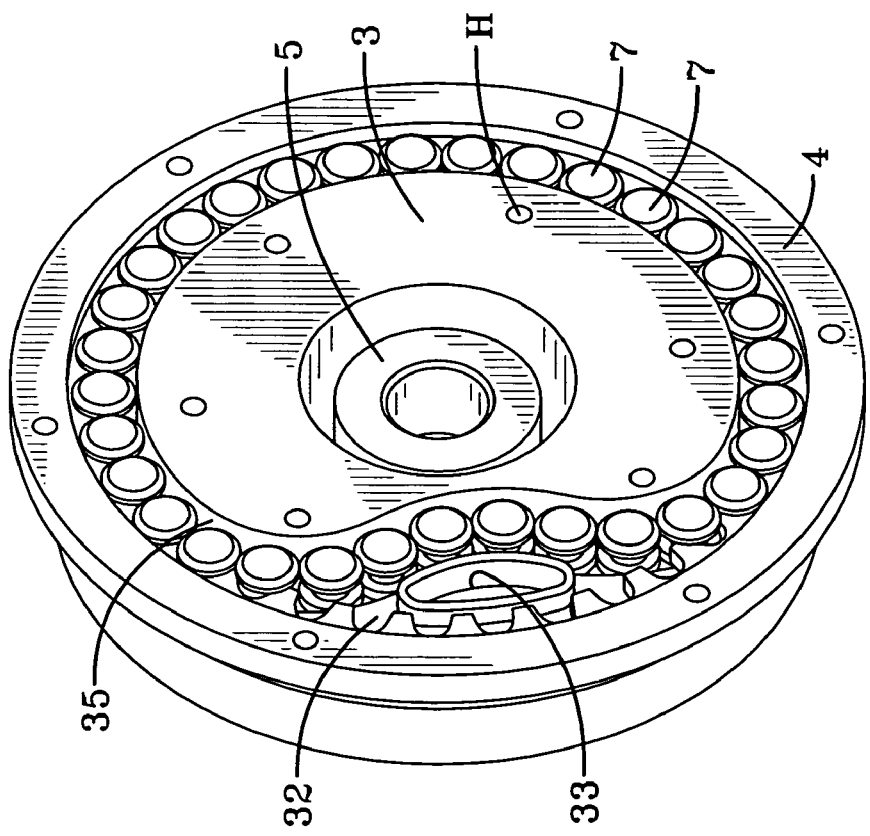
FIG. 8 is a perspective front view of the assembly of FIG. 7.

FIGS. 7-9 show a third embodiment 1B of an assembly according to the present invention, wherein the circulation of the coupling elements is internal the rotor portion 2. The driving gear 4 and the driven gear 5 are internally toothed wheels respectively coupled to the steering wheel ring portion and to the steering wheel shaft. The intermediate element 3 is coupled to a stationary part of the vehicle and is provided, on its first part 31, with a guide 35 for guiding the moving coupling elements 6. The lobe portion 32 is directed toward the axis X of the intermediate element 3, internally with respect to the periphery. Deviation of the coupling elements 6 (the rollers) from their circular path is thus provided at one or more internal lobes 32.

Figure 11:
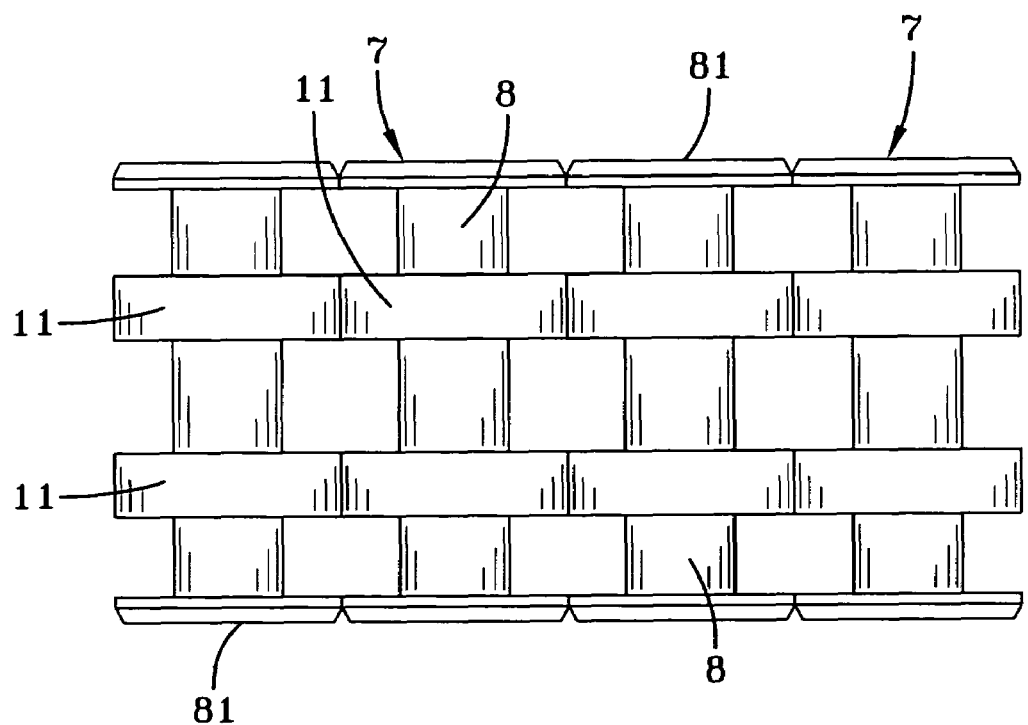
FIG. 11 is a side view of a component of the assembly shown in FIG. 7.

Since the rollers 6 are supported along their axis through the ends 81 by the gears 4, 5, disc portions 11, 12 could not be necessary. Axial forces acting on the rollers 6 are directly supported by the gears 4, 5. FIG. 11 shows the coupling elements (rollers 6) utilized for the assembly 1B.

The airbag module or other control modules are fixed to the element 3, for instance to the holes H shown in FIG. 8. A passage through the openings 33, 34 (FIGS. 7 and 9) of the lobe portion 32 is provided for enabling an easy cabling of the module or of the static electronic controls (for instance an LCD display or monitor) eventually positioned on the steering wheel.

The steering wheel static driver airbag module assembly 1, 1A or 1B has a simple structure that involves low production and assembling costs and a reliable operation in time. Since the rotor 2 and the stator 3 are arranged substantially coaxially, the assembly is compact and do not require dramatic modifications in the design of conventional steering wheels.

The assembly of the invention may be used not only for supporting an airbag module, but also for stationary supporting automotive controls on steering wheels, monitors, etc.

It is understood that the invention is not limited to the particular construction and arrangement of parts herein illustrated and described, but embraces all such modified forms thereof as come within the scope of the following claims.

The invention claimed is:

1. An assembly of a steering wheel and a static driver airbag module, the assembly comprising:
   a rotor portion and a stator portion;
   a first gear and a second gear, which are at least partially superimposed;
   an intermediate element supporting said first and second gear; and
   a means for axially coupling said first and second gear;
   said intermediate element having at least a first portion interposed between said two gears and at least a second portion extending from said first portion, said second portion defining a path for said means for axially coupling said first and second gear to disengage said means from said gears and to successively engage again said means with said gears when a relative rotation between said intermediate element and said first and second gear occurs.

2. The assembly of a steering wheel and a static driver airbag module according to claim 1, wherein said first and second gears are circular toothed wheels arranged coaxially.

3. The assembly of a steering wheel and a static driver airbag module according to claim 2, wherein said first gear is a driving gear coupled to the ring portion of said steering wheel, and said second gears are driven gears coupled to a vehicle steering shaft, and said intermediate element is coupled to said airbag module and to said vehicle to remain stationary.

4. The assembly of a steering wheel and a static driver airbag module according to claim 3, wherein said means for axially coupling said first and second gear are moved by said driving gear and transmit torque and motion to said driven gear, guided by said at least a first part and said at least a second part of the intermediate element.

5. The assembly of a steering wheel and a static driver airbag module according to claim 2, wherein said first gear is coupled to said airbag module in a stationary position with respect to said vehicle, said second gear is coupled in a stationary position to said vehicle, and said intermediate element is coupled to the ring portion of said steering wheel and to a vehicle steering shaft, wherein a relative circulation of said means for axially coupling said first and second gear with respect to said intermediate element occurs, said means for axially coupling said first and second gear being guided by said at least a first part and said at least one second part of the intermediate element.

6. The assembly of a steering wheel and a static driver airbag module according to claim 1, wherein said first part of said intermediate element has a substantially circular shape and said at least one second part of said intermediate element has a lobe shape.

7. The assembly of a steering wheel and a static driver airbag module according to claim 4, wherein when said means for axially coupling said first and second gear are guided by said at least one first part of said intermediate element they engage said gears, and when said means for axially coupling said first and second gear are guided by said at least one second part of said intermediate element they are moved apart from said gears.

8. The assembly of a steering wheel and a static driver airbag module according to claim 4, wherein said gears slidingly rotate on said first part of said intermediate element.

9. The assembly of a steering wheel and a static driver airbag module according to claim 6, wherein said intermediate element is provided with a through-hole that communicates an exit opening of said at least one lobe-shaped part with an exit opening of said first part through said gears.

10. The assembly of a steering wheel and a static driver airbag module according to claim 1, wherein said means for axially coupling said first and second gear are rollers having a cylindrical core engaging the grooves between two superimposed teeth of said gears, and two or more disc portions for the vertical abutment of the means for axially coupling said first and second gear one with another.

11. The assembly of a steering wheel and a static driver airbag module according to claim 6, wherein said means for axially coupling said first and second gear are linked to form a chain.

12. The assembly of a steering wheel and a static driver airbag module according to claim 1, wherein the assembly further comprises one or more bearings interposed between said intermediate element and said gears to resist forces substantially acting along their axis.

13. The assembly of a steering wheel and a static driver airbag module according claim 1, wherein said intermediate element is provided with a guiding groove and said means for axially coupling said first and second gear have at least one disc portion which at least partially fits said groove.

14. The assembly of a steering wheel and a static driver airbag module according to claim 1, wherein said gears are internally toothed wheels and said second portion of said intermediate element is protruding internally to said element and said gears.

15. The assembly of a steering wheel and a static driver airbag module according to claim 1, wherein the assembly further comprises a casing that co-operates with said intermediate element and said gears to guide said means for axially coupling said first and second gear.

* * * * *